US012800052B2

(12) United States Patent
Matsumoto et al.

(10) Patent No.: US 12,800,052 B2
(45) Date of Patent: Nov. 17, 2026

(54) MOTOR-OPERATED VALVE

(71) Applicant: DENSO CORPORATION, Kariya-city (JP)

(72) Inventors: Takafumi Matsumoto, Kariya-city (JP); Hiroto Inoue, Kariya-city (JP); Takuro Sahara, Kariya-city (JP); Shinji Hashimoto, Kariya-city (JP); Satoshi Miyano, Kariya-city (JP); Riku Ouchi, Kariya-city (JP); Hiroyuki Kawashima, Kariya-city (JP); Shigeji Oishi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 37 days.

(21) Appl. No.: 18/983,052

(22) Filed: Dec. 16, 2024

(65) Prior Publication Data

US 2025/0116347 A1 Apr. 10, 2025

Related U.S. Application Data

(63) Continuation of application No. PCT/JP2023/021885, filed on Jun. 13, 2023.

(30) Foreign Application Priority Data

Jun. 24, 2022 (JP) ................................ 2022-101834

(51) Int. Cl.
*F16K 31/04* (2006.01)
*H02K 49/10* (2006.01)
*H02P 29/40* (2016.01)

(52) U.S. Cl.
CPC ......... *F16K 31/046* (2013.01); *H02K 49/102* (2013.01); *H02P 29/40* (2016.02)

(58) Field of Classification Search
None
See application file for complete search history.

(56) References Cited

FOREIGN PATENT DOCUMENTS

| | | | | |
|---|---|---|---|---|
| CN | 107606211 A | * | 1/2018 |
| JP | H09233875 A | * | 9/1997 |
| JP | 2020034140 A | | 3/2020 |

OTHER PUBLICATIONS

U.S. Appl. No. 18/983,205, filed Dec. 16, 2024, Takafumi Matsumoto et al.

* cited by examiner

*Primary Examiner* — Atif H Chaudry
(74) *Attorney, Agent, or Firm* — Harness, Dickey & Pierce, P.L.C.

(57) ABSTRACT

A motor-operated valve includes a motor, valve seat, valve body, magnetic gear, and controller. The motor generates rotational force when powered, allowing the valve body to open and close the valve port, which permits fluid passage. The magnetic gear transmits this force from the motor to the valve body. The controller regulates the electric current supplied to the motor. During fully-closed operation, the controller limits the current to less than a fully-closed current limit value, ensuring the valve port is completely closed. This limit value is higher than the adjusting current value, which is the current supplied during valve opening adjustments.

14 Claims, 9 Drawing Sheets

III-III

MOTOR-OPERATED VALVE

CROSS REFERENCE TO RELATED APPLICATIONS

The present application is a continuation application of International Patent Application No. PCT/JP2023/021885 filed on Jun. 13, 2023, which designated the U.S. and claims the benefit of priority from Japanese Patent Application No. 2022-101834 filed on Jun. 24, 2022. The entire disclosures of all of the above applications are incorporated herein by reference.

TECHNICAL FIELD

The present disclosure relates to a motor-operated valve that is opened and closed by an electric motor.

BACKGROUND

An electric motor drives a main valve in a motor-operated valve, and the main valve seats on a valve seat, which causes the valve port to be closed.

SUMMARY

According to at least one embodiment, a motor-operated valve includes a motor, a valve seat, a valve body, a magnetic gear, and a controller.

The motor generates rotational driving force when electric power is supplied. The valve seat forms the valve port through which the fluid passes. The valve body opens and closes the valve port. The magnetic gear magnetically transmits the rotational driving force from an output shaft of the motor to the valve body. The controller controls an electric current supplied to the motor.

The controller limits the electric current supplied to the motor to less than a fully-closed current limit value during fully-closed operation, when the valve port is to be fully closed by the valve body. The fully-closed current limit value is greater than an adjusting current value. The adjusting current value is an electric current value supplied to the motor during opening adjustment of the valve port, when the valve opening is adjusted by the valve body.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
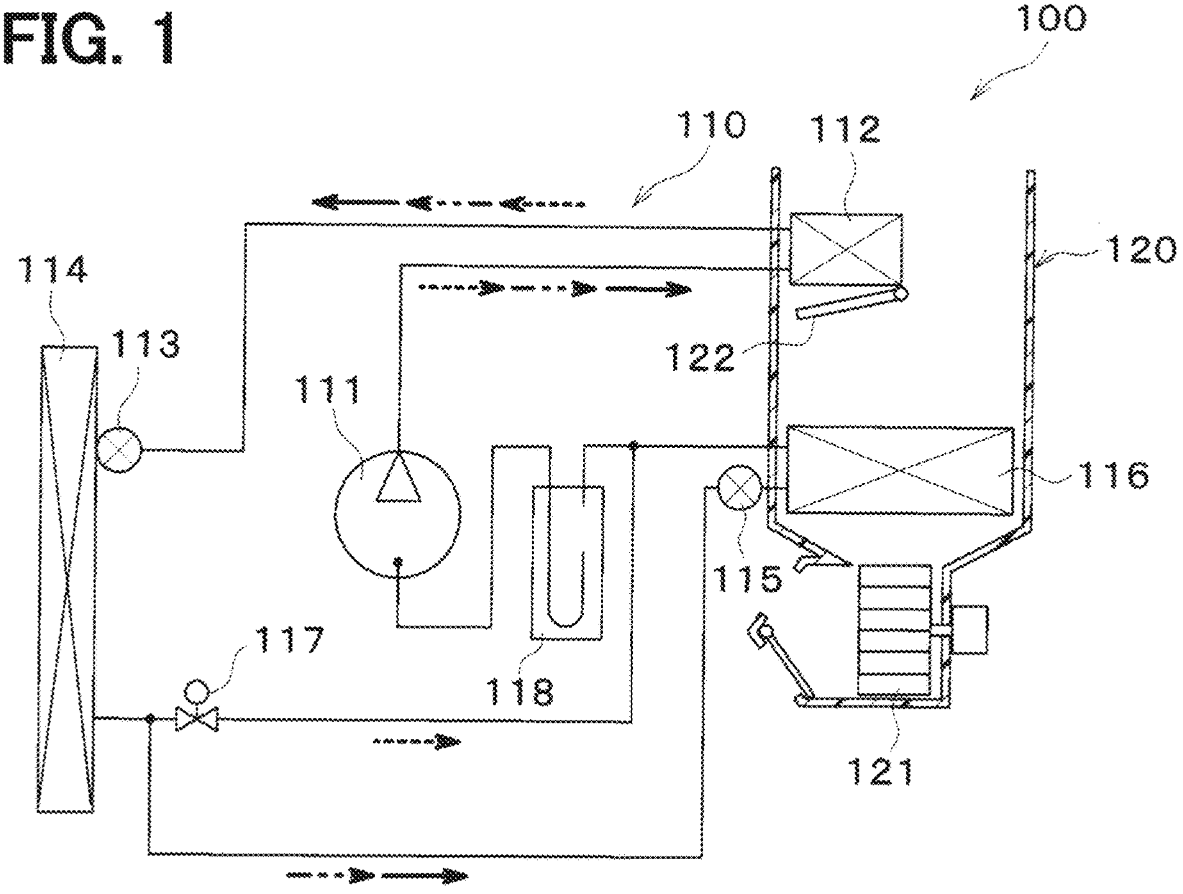
FIG. 1 is an overall configuration diagram of a vehicle air-conditioning device according to a first embodiment.

To begin with, examples of relevant techniques will be described.

A motor-operated valve according to a comparative example includes an electric motor drives a main valve, and the main valve seats on a main valve seat, which causes a main valve port to be closed.

In a case of motor-operated valves, fluid must be well sealed to prevent the flow-regulated fluid from entering the electric motor. As a countermeasure, a magnetic gear that magnetically transmits a rotational drive force from an electric motor to a valve may be used in a transmission mechanism.

However, with this countermeasure, if a torque of the electric motor exceeds a stall torque of the magnetic gear, the magnetic gear will stall and repeat forward and reverse rotation, making it impossible to close the valve securely and causing fluid leakage.

In contrast to the comparative example, according to a motor-operated valve with magnetic gears of the present disclosure, fluid leakage can be reduced at a time of total closure.

According to one aspect of the present disclosure, a motor-operated valve according includes a motor, a valve seat, a valve body, a magnetic gear, and a controller.

The motor generates rotational driving force when electric power is supplied. The valve seat forms the valve port through which the fluid passes. The valve body opens and closes the valve port. The magnetic gear magnetically transmits the rotational driving force from an output shaft of the motor to the valve body. The controller controls an electric current supplied to the motor.

The controller limits the electric current supplied to the motor to less than a fully-closed current limit value during fully-closed operation, when the valve port is fully closed by the valve body. The fully-closed current limit value is greater than an adjusting current value. The adjusting current value is an electric current value supplied to the motor during opening adjustment of the valve port, when the valve opening is adjusted by the valve body.

According to this configuration, the stalling of the magnetic gear due to excessive the electric current supplied to the motor during the fully-closed operation can be reduced. Therefore, reversal of the valve body due to de-tuning of the magnetic gear can be reduced, which improves the full-closing performance of the valve port.

Hereinafter, embodiments for implementing the present disclosure will be described referring to drawings. In each embodiment, portions corresponding to those described in the preceding embodiment are denoted by the same reference numerals, and overlapping descriptions may be omitted. In a case where only a part of the configuration is described in each embodiment, other embodiments previously described can be applied to other parts of the configuration. It is also possible to partially combine the embodiments even when it is not explicitly described, as long as there is no problem in the combination as well as the combination of the parts specifically and explicitly described that the combination is possible.

First Embodiment

A first embodiment of the present disclosure will be described with reference to FIGS. 1 to 7. A power transmission device 1 of the present embodiment is applied to a first expansion valve 113 and a second expansion valve 115 of a vapor compression refrigeration cycle 110. The expansion valves 113, 115 are an example of a motor-operated valve or a solenoid valve. The vapor compression refrigeration cycle 110 is applied to a vehicle air-conditioning device 100 shown in FIG. 1. The vehicle air-conditioning device 100 for vehicles is applied to an electric vehicle that obtains its driving power for vehicle running from an electric motor for driving.

The vehicle air-conditioning device 100 has three operating modes: a cooling mode for cooling a vehicle compartment in the vehicle; a heating mode for heating the vehicle compartment; and a dehumidifying-heating mode for heating and dehumidifying the vehicle compartment. In FIG. 1, refrigerant flow in the cooling mode is indicated by solid arrows, refrigerant flow in the heating mode is indicated by dashed arrows, and refrigerant flow in the dehumidifying-heating mode is indicated by two-dot chain arrows.

The vehicle air-conditioning device 100 includes the vapor compression refrigeration cycle 110 and an air conditioning unit 120 for the vehicle compartment.

The vapor compression refrigeration cycle 110 includes a compressor 111, an indoor heat exchanger 112, the first expansion valve 113, an outdoor heat exchanger 114, the second expansion valve 115, an evaporator 116, a solenoid valve 117, and an accumulator 118.

The compressor 111 is an electric compressor that draws, compresses, and discharges refrigerant. The vapor compression refrigeration cycle 110 is a subcritical cycle in which a high refrigerant pressure does not exceed the critical pressure of the refrigerant, and a CFC refrigerant (for example, R134a) is used as the refrigerant circulating in the vapor compression refrigeration cycle 110.

The indoor heat exchanger 112 condenses the refrigerant discharged from the compressor 111 by heat exchange with air flowing in the air conditioning unit 120. The first expansion valve 113 decompresses and expands the refrigerant condensed in the indoor heat exchanger 112. The outdoor heat exchanger 114 exchanges heat between the refrigerant discharged from the first expansion valve 113 and outside air.

The second expansion valve 115 decompresses and expands the refrigerant flowing out of the outdoor heat exchanger 114. The evaporator 116 evaporates the refrigerant decompressed and expanded by the second expansion valve 115 by heat exchange with the air flowing in the air conditioning unit 120.

The solenoid valve 117 opens and closes a refrigerant flow path leading the refrigerant flowing out of the outdoor heat exchanger 114 to the accumulator 118 bypassing the second expansion valve 115 and the evaporator 116. The accumulator 118 separates a gas-liquid of the refrigerant that has evaporated in the evaporator 116 and the refrigerant that has passed through the solenoid valve 117.

The air conditioning unit 120 is located in the vehicle compartment and forms an air passage within the air conditioning unit 120. A blower 121, the evaporator 116, the indoor heat exchanger 112, and an air mix door 122 are located in the air passage in the air conditioning unit 120.

The blower 121 is an electric blower that blows air into the air passage in the air conditioning unit 120. The evaporator 116 is located downstream of the airflow relative to the blower 121. The indoor heat exchanger 112 is located downstream of the airflow relative to the evaporator 116. The air mix door 122 regulates a flow ratio between the air flowing to the indoor heat exchanger 112 and the air bypassing the indoor heat exchanger 112. The air conditioning unit 120 blows air conditioned by the air mix door 122 into the vehicle compartment.

In the cooling mode of the vehicle air-conditioning device 100, the solenoid valve 117 is closed and the air mix door 122 closes the air passage to the indoor heat exchanger 112. Therefore, the refrigerant discharged from the compressor 111 passes through the indoor heat exchanger 112 without heat exchange in the indoor heat exchanger 112, and flows in the following order: the first expansion valve 113, the outdoor heat exchanger 114, the second expansion valve 115, the evaporator 116, the accumulator 118, and returns to the compressor 111 from the accumulator 118.

At this time, the first expansion valve 113 is set to a fully opening degree at which the flow of the refrigerant is not reduced, and the second expansion valve 115 is set to a valve opening degree at which the flow of the refrigerant is reduced, and therefore the refrigerant is condensed in the outdoor heat exchanger 114 and the refrigerant is vaporized in the evaporator 116.

In the heating mode of the vehicle air-conditioning device 100, the solenoid valve 117 is set to open, the second expansion valve 115 is set to close to shut off refrigerant flow, and the air mix door 122 is opened to allow air to circulate to the indoor heat exchanger 112. Therefore, the refrigerant discharged from the compressor 111 flows in the following order: the indoor heat exchanger 112, the first expansion valve 113, the outdoor heat exchanger 114, the solenoid valve 117, and the accumulator 118, and returns to the compressor 111 from the accumulator 118. At this time, the first expansion valve 113 is set to a valve open degree to restrict the refrigerant flow, and the second expansion valve 115 is closed, so that the refrigerant is condensed in the indoor heat exchanger 112, the refrigerant is evaporated in the outdoor heat exchanger 114, and no refrigerant flows into the evaporator 116.

In the dehumidifying-heating mode of the vehicle air-conditioning device 100, the solenoid valve 117 is closed and the air mix door 122 is opened so that the air is distributed to the indoor heat exchanger 112. Therefore, the refrigerant discharged from the compressor 111 flows in the following order: the indoor heat exchanger 112, the first expansion valve 113, the outdoor heat exchanger 114, the second expansion valve 115, the evaporator 116, the accumulator 118, and returns to the compressor 111 from the accumulator 118.

At this time, the first expansion valve 113 and the second expansion valve 115 are set to valve openings that restrict refrigerant flow, so that the refrigerant is condensed in the indoor heat exchanger 112 and evaporated in the outdoor heat exchanger 114 and evaporator 116.

Figure 2:
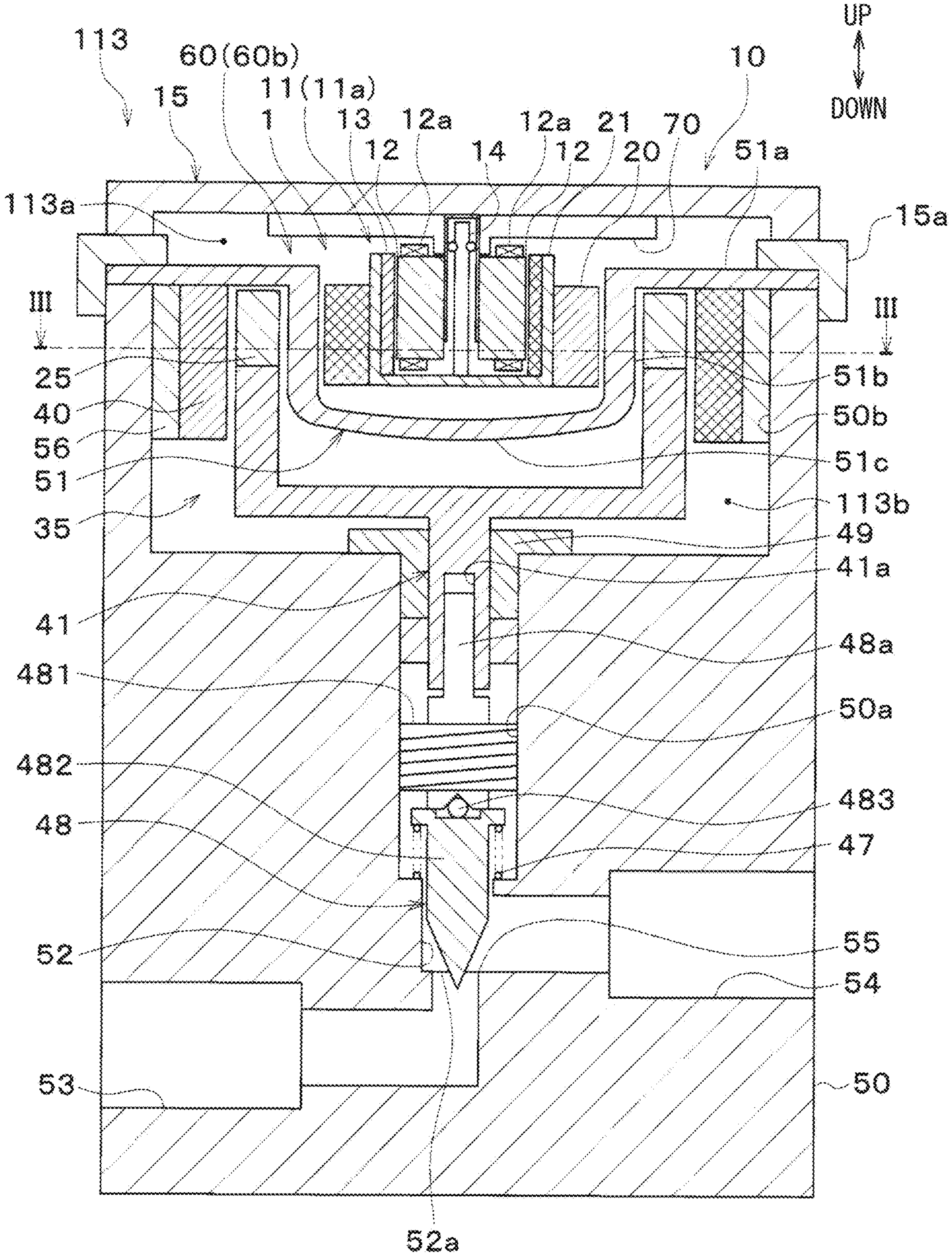
FIG. 2 is a cross-sectional view illustrating a first expansion valve of the first embodiment.

As shown in FIG. 2, the first expansion valve 113 has a power transmission device 1, a drive-mechanism section 10, and a driven-mechanism section 35. The first expansion valve 113 is positioned vertically in the vehicle. The vertical arrangement is an arrangement in which an axial direction of a valve body 48 is parallel to a up-down direction of the vehicle and the drive-mechanism section 10 is on an upper side of the vehicle relative to the driven-mechanism section 35.

The power transmission device 1 transmits driving power generated by the drive-mechanism section 10 to the driven-mechanism section 35 using magnetic force.

The drive-mechanism section 10 has a motor 11 and a motor case 15. The motor 11 can be driven by speed feedback control and has a stator 12, a rotor 13, and a shaft 14. The motor 11 is, for example, a three-phase brushless motor or a DC brush motor.

The shaft 14 is an output shaft of the motor 11 and an input shaft of the power transmission device 1, and rotates together with the rotor 13. The motor case 15 houses the motor 11.

The stator 12 is fixed to the motor case 15. The stator 12 includes a stator coil 12*a*. In the present embodiment, the number of slots Ns in the stator 12 is six.

Figure 3:
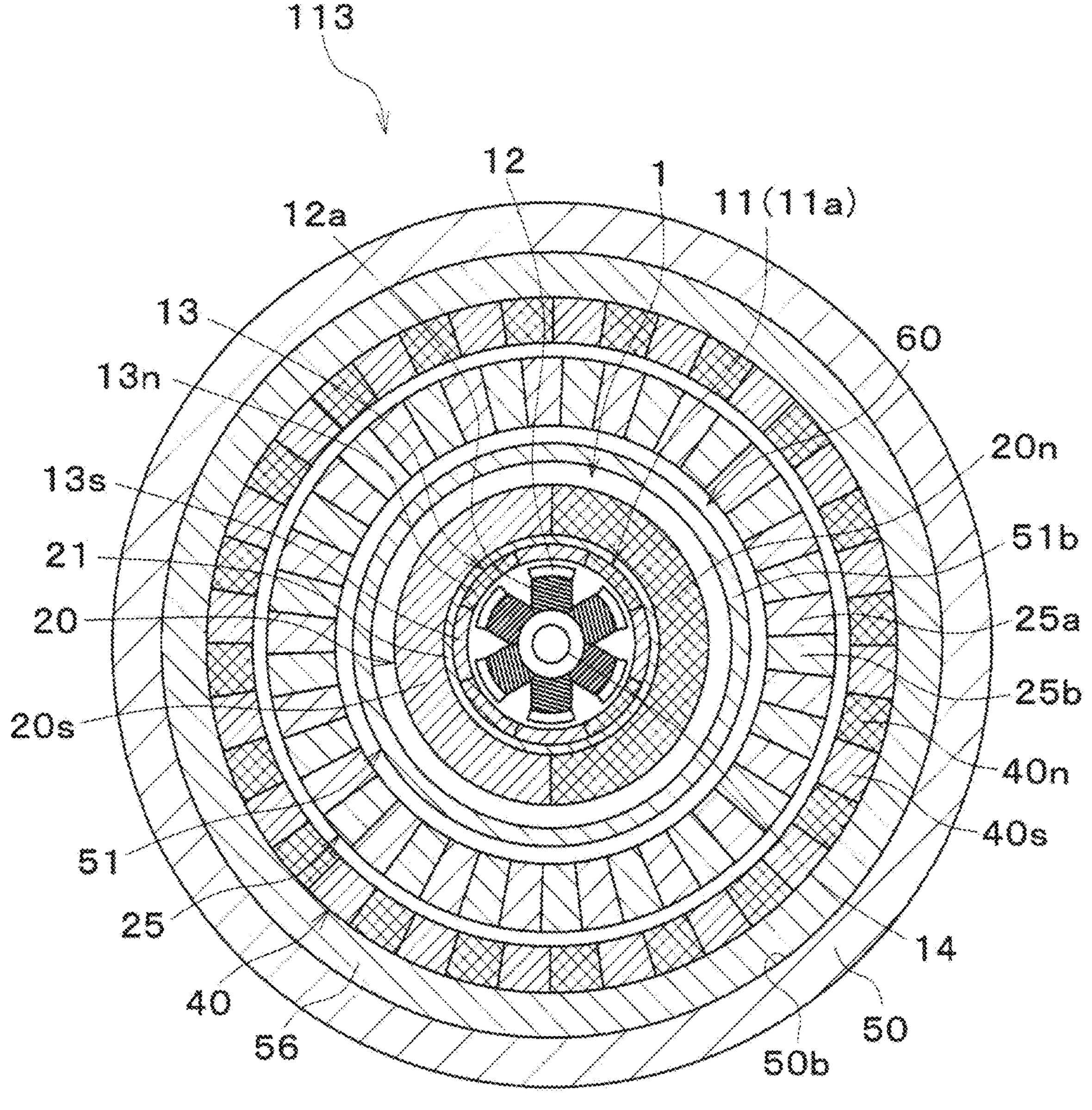
FIG. 3 is a cross-sectional view taken along a line III-III of FIG. 2.

The rotor 13 is cylindrical and the stator 12 is located inside the rotor 13. As shown in FIG. 3, the rotor 13 has a plurality of pairs of magnets consisting of an N-pole 13*n* and an S-pole 13*s* arranged along a circumferential direction. In the present embodiment, there are four each of N-poles 13*n* and S-poles 13*s*, so the number of poles Pr in the rotor 13 is eight. The stator 12 and the rotor 13 output the driving force to rotate the shaft 14 by electromagnetic force.

The motor case 15 has a shaft alignment portion 15*a* for aligning (centering) the shaft 14 of the drive-mechanism section 10 and a rotating member 41 of the driven-mechanism section 35. The shaft alignment portion 15*a* is fitted to a body 50 of the driven-mechanism section 35.

The circuit section 70 is housed in the motor case 15. The circuit section 70 has a circuit board with multiple electronic components for controlling the motor 11.

The driven-mechanism section 35 includes the rotating member 41, the valve body 48, a bearing 49, and the body 50. The rotating member 41, the valve body 48, and the bearing 49 are housed in the body 50. The body 50, together with the motor case 15, constitutes a housing of the first expansion valve 113. The body 50 has a valve chamber 52, an inlet connection port 53, an outlet connection port 54, and a valve seat 55. The body 50 is a valve port forming member that forms a valve port 52*a* of the valve chamber 52.

The rotating member 41 is an output shaft of the power transmission device 1 and rotates by the driving force transmitted from the drive-mechanism section 10. The rotating member 41 is a rod-shaped member and is coaxially disposed with the shaft 14. An engagement groove 41*a* is formed in an end of the rotating member 41 opposite the drive-mechanism section 10. The rotating member 41 is rotatably supported by a bearing 49 fixed to the body 50.

The valve body 48 is a rod-shaped member located in the valve chamber 52. The valve body 48 is coaxially disposed with the rotating member 41. A protruding piece 48*a* of the valve body 48 engages the engagement groove 41*a* of the rotating member 41. As a result, the rotational force of the rotating member 41 is transmitted to the valve body 48.

The protruding piece 48*a* is formed at one end of the valve body 48. An outer surface of the valve body 48 has a male screw. The male screw of the valve body 48 are screwed into a screw hole 50*a* formed in the body 50, constituting a screw mechanism. As a result, the valve body 48 moves axially as the valve body 48 rotates.

The valve body 48 includes multiple members. More specifically, the valve body 48 includes a male screw member 481, which is located closer to the rotating member 41 and formed with the male screw, a valve seat member 482, which is located closer to the valve seat 55 side, and a ball 483 disposed between the two members 481, 482. With the ball 483 positioned between the two members 481, 482, the valve seat member 482 of the valve body 48 moves axially without rotation.

The valve seat member 482 being a ball receiving member in the valve body 48 is biased by a coil spring 47 to a side in which the valve body 48 is axially away from the valve seat 55.

The valve body 48 moves in the axial direction, causing the valve body 48 to contact or move away from the valve seat 55, opening or closing the valve port 52*a* of the valve chamber 52. In the valve chamber 52, as the valve body 48 leaves the valve seat 55, the refrigerant flows from the inlet connection port 53 to the outlet connection port 54 through the valve port 52*a* to reduce pressure and expansion.

The power transmission device 1 includes a non-contact coupling portion 60. The non-contact coupling portion 60 has a magnetic gear 60*b* and a sealing plate 51. The magnetic gear 60*b* has a drive magnet 20, a pole piece 25 and a fixed magnet 40.

The drive magnet 20 rotates together with the shaft 14 of the motor 11. The pole piece 25 modulates a magnetic flux between the drive magnet 20 and the fixed magnet 40, and rotates together with the rotating member 41. The fixed magnet 40 is fixed to the body 50 of the first expansion valve 113.

The drive magnet 20 is cylindrical and is joined to an outer surface of the rotor 13 of the motor 11 via a cylindrical intervening member 21. In other words, the motor 11 is located inside the drive magnet 20. The intervening member 21 is formed of magnetic material.

The drive magnet 20 has at least one pair of magnets consisting of an N-pole 20*n* and an S-pole 20*s* arranged along a circumferential direction. In the present embodiment, there is one N-pole 20*n* and one S-pole 20*s* each, so the number of poles Pin of the drive magnet 20 is two.

The number of poles Pin of the drive magnet 20 is the same as the number of poles Pr of the rotor 13 minus the number of slots Ns of the stator 12. In the present embodiment, the number of poles Pr of the rotor 13 is eight and the number of slots Ns of the stator 12 is six, so the number of poles Pin of the drive magnet 20 is two.

The sealing plate 51 is a sealing member that divides an internal space of the first expansion valve 113 into a drive space 113*a* and a driven space 113*b*, and seals the driven space 113*b*. The drive space 113*a* is a space in the drive-mechanism section 10, and the driven space 113*b* is a space in the driven-mechanism section 35.

The sealing plate 51 prevents refrigerant (high-pressure refrigerant) in the driven space 113*b* from leaking into the drive space 113*a*. In the present embodiment, the sealing plate 51 is made of non-magnetic material (for example, SUS 305).

The sealing plate 51 is disk-shaped with a middle portion concave downward and has a sealing top portion 51*a*, a sealing cylindrical portion 51*b*, and a sealing bottom portion 51*c*. The sealing top portion 51*a* is a circular plate and its outer edge is fixed to the body 50 of the first expansion valve 113. The sealing cylindrical portion 51*b* is cylindrical and located closer to an outer diameter of the drive magnet 20. The sealing bottom portion 51*c* is located below the drive magnet 20 and seals the sealing cylindrical portion 51*b* from the drive space 113*a*.

The sealing bottom portion 51*c* is disk-shaped with a middle portion curved downward. A corner that form a boundary between the sealing cylindrical portion 51*b* and the sealing bottom portion 51*c* are not right-angled, but rounded with a predetermined radius of curvature to enhance pressure resistance.

To improve the pressure resistance of the sealing plate 51, the sealing top portion 51*a*, the sealing cylindrical portion 51*b*, and the sealing bottom portion 51*c* are integrally molded.

The sealing bottom portion 51*c* is located in a gap between the shaft 14 and the rotating member 41 in the axial direction of the shaft 14 and the rotating member 41. In other words, the sealing bottom portion 51*c* is located at a location with few torque generation points. This makes it easier to ensure torque and pressure resistance in the sealing plate 51.

The pole piece 25 is cylindrical and is located closer to an outer surface of the sealing cylindrical portion 51*b* of the sealing plate 51. The pole piece 25 is joined to the rotating member 41 of the driven-mechanism section 35.

The fixed magnet 40 is cylindrical and is located closer to an outer surface of the pole piece 25. The fixed magnet 40 is fitted into a cylindrical body cylindrical portion 50*b* (in other words, a housing cylindrical portion) of the body 50 (in other words, the housing) via a cylindrical back yoke 56. The back yoke 56 and the body cylindrical portion 50*b* are formed of magnetic material.

The fixed magnet 40 has a pair of magnets consisting of N-pole 40*n* and S-pole 40*s*, arranged at equal intervals along the circumferential direction. The number of poles Pf of the fixed magnet 40 is more than the number of poles Pin of the drive magnet 20. In the present embodiment, the number of poles Pf of the fixed magnet 40 is forty, since there are twenty N-poles 40*n* and twenty S-poles 40*s*.

The pole piece 25 has magnetic sections 25*a* and non-magnetic sections 25*b*. The magnetic sections 25*a* and the non-magnetic sections 25*b* are fan-shaped, and the magnetic sections 25*a* are arranged at equal intervals along the circumferential direction. One of the non-magnetic sections 25*b* is located between the magnetic sections 25*a*. For example, the magnetic sections 25*a* are formed of soft magnetic material (for example, iron-based metal), and the non-magnetic sections 25*b* are formed of non-magnetic material (for example, stainless steel or resin).

The number of poles Pp of pole pierces 25 is the same as the sum of the number of poles Pin of the drive magnet 20 and the number of poles Pf of the fixed magnet 40. In the present embodiment, the number of poles Pin of the drive magnet 20 is two and the number of poles Pf of the fixed magnet 40 is forty, so the number of poles Pp of the pole piece 25 is forty two. That is, the magnetic sections 25*a* are 21, and the non-magnetic sections 25*b* are 21. In other words, the number Npp of the magnetic sections 25*a* has the following relationship to the number of poles Pin of the drive magnet 20 and the number of poles Pf of the fixed magnet 40.

$$Npp=(Pin+Pf)/2$$

An axial length of the pole piece 25 is shorter than an axial length of the fixed magnet 40. As a result, flux leakage in the axial direction at the pole piece 25 can be reduced and the transmission torque can be improved.

Since a configuration of the second expansion valve 115 is similar to that of the first expansion valve 113, a detailed configuration description of the second expansion valve 115 is omitted.

Figure 4:
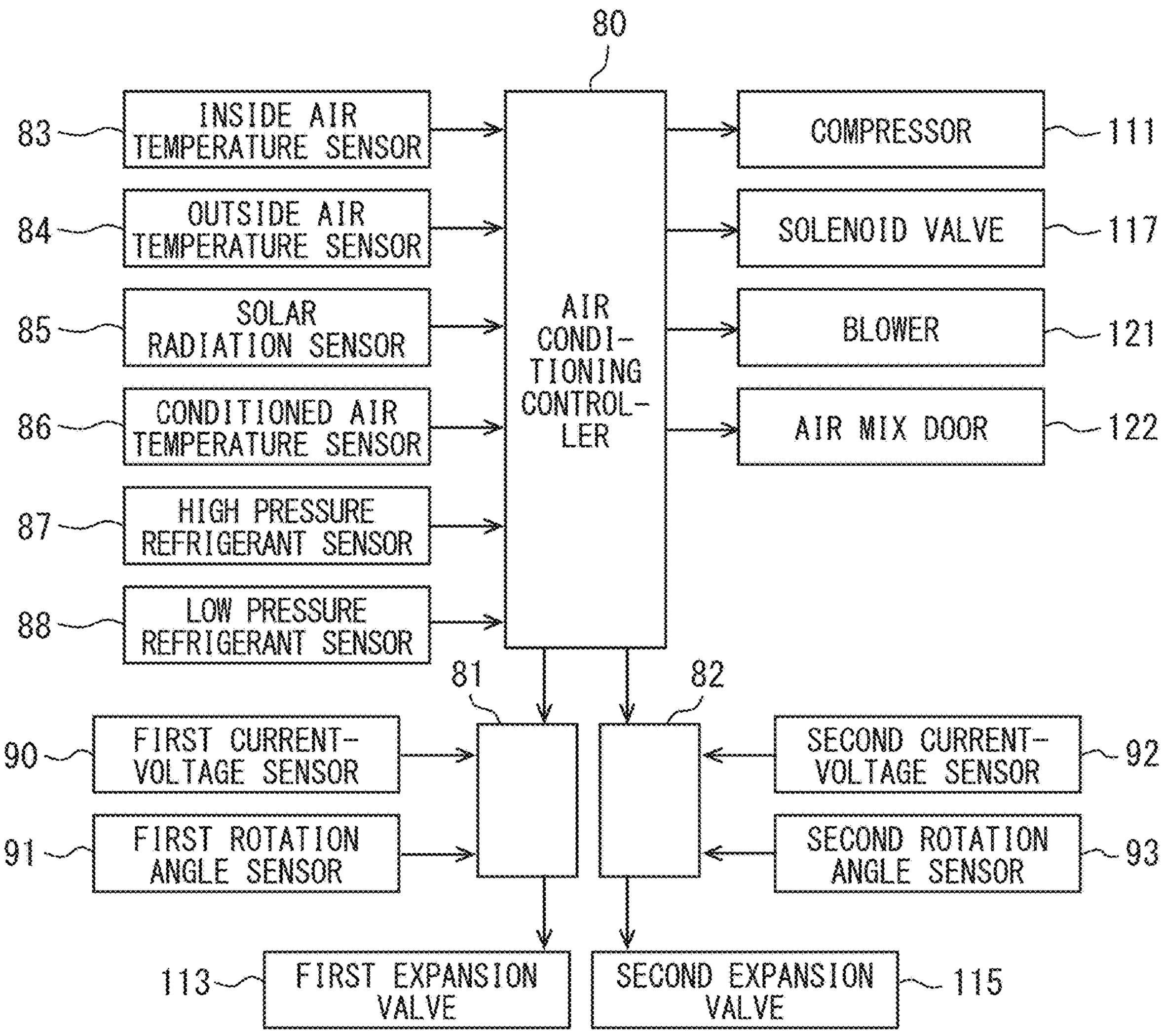
FIG. 4 is a block diagram illustrating a controller of the vehicle air-conditioning device according to the first embodiment.

Next, the outline of a controller of the present embodiment will be described. The air conditioning controller 80, a first expansion valve controller 81, and a second expansion valve controller 82 shown in FIG. 4 are electronic control units with well-known microcontrollers including a central processing device (i.e., CPU), a read only memory (i.e., ROM), a random access memory (i.e., RAM), and peripheral circuits. The air conditioning controller 80, the first expansion valve controller 81, and the second expansion valve controller 82 perform various calculations and processing based on a control program stored in the ROM, and control operation of various control target devices connected to an output side.

The first expansion valve controller 81 and the second expansion valve controller 82 are connected to the air conditioning controller 80 via a harness to communicate with each other. Therefore, based on detection or operation signals input to one controller, the operation of the controlled equipment connected to the output side of the other controller can be controlled.

The air conditioning controller 80 controls the operation of the compressor 111 of the vapor compression refrigeration cycle 110, the solenoid valve 117, the blower 121 of the air conditioning unit 120, and actuators for driving the air mix door 122.

The first expansion valve controller 81 controls the operation of the first expansion valve 113 of the refrigeration cycle 110. More specifically, the first expansion valve controller 81 calculates a value of a driving current to be output to the motor 11, and outputs the driving current to the motor 11 based on the calculation result. The first expansion valve controller 81 is composed of the circuit section 70 of the first expansion valve 113.

The second expansion valve controller 82 controls the operation of the second expansion valve 115 of the vapor compression refrigeration cycle 110. More specifically, the second expansion valve controller 82 calculates a value of a driving current to be output to the motor 11, and outputs the driving current to the motor 11 based on the calculation result. The second expansion valve controller 82 is composed of the circuit section 70 of the second expansion valve 115.

A group of control sensors, including an inside air temperature sensor 83, an outside air temperature sensor 84, a solar radiation sensor 85, a conditioned air temperature sensor 86, a high pressure refrigerant sensor 87, and a low pressure refrigerant sensor 88, are connected to the input side of the air conditioning controller 80. Detection signals of the group of control sensors for air conditioning control are input to the air conditioning controller 80. These sensors are included in components that make up the refrigeration cycle.

The inside air temperature sensor 83 is an inside-air temperature detector that detects an inside air temperature Tr that is a temperature in the vehicle compartment. The outside air temperature sensor 84 is an outside-air temperature detector that detects an outside air temperature Tam that is a temperature outside the vehicle compartment. The solar radiation sensor 85 is a solar radiation amount detection unit which detects a solar radiation amount as irradiated into the vehicle compartment. The conditioned air temperature sensor 86 is an air-conditioning air temperature detector that detects a temperature TAV of an air-conditioning air blown into the vehicle compartment from the air conditioning unit 120.

The high pressure refrigerant sensor 87 is a high pressure side refrigerant detector that detects a pressure and temperature of a high pressure side refrigerant of the vapor compression refrigeration cycle 110. The low pressure refrigerant sensor 88 is a low pressure side refrigerant detector that detects a pressure and temperature of the low pressure side refrigerant of the vapor compression refrigeration cycle 110.

Various operation switches on an air conditioning operation panel are also connected to the input side of the air conditioning controller 80. The air conditioning operation panel is disposed near an instrument panel in a front part of the vehicle compartment. The instrument panel is located at the front of the vehicle compartment, near the front of a driver's seat. The instrument panel displays various information such as traveling speed of the electric vehicle and the operating status of the electric vehicle. The instrument panel warns occupants by display and sound when there is an abnormality or malfunction in various devices of the electric vehicle.

Operation signals output from the various operation switches of the air conditioning operation panel are input to the air conditioning controller 80. Specific examples of the various operation switches provided on the air conditioning operation panel include an auto switch, an air conditioner switch, an air volume setting switch, and a temperature setting switch.

The auto switch is an operation unit for the occupants to set or cancel the automatic control operation of the air conditioning in the vehicle compartment. The air conditioner switch is an operation unit for the occupants to request cooling of the air in the in the vehicle compartment. The air volume setting switch is an operation unit for the occupants to manually set the air volume of the blower 121. The temperature setting switch is an operation unit that allows the occupants to set a set temperature Tset in the vehicle compartment.

A first current-voltage sensor 90 and a first rotation angle sensor 91 are connected to the input side of the first expansion valve controller 81. The first current-voltage sensor 90 is a first expansion valve current-voltage detector that detects an electric current and a voltage supplied to the motor 11 of the first expansion valve 113. The first rotation angle sensor 91 is a first rotation angle detector that detects a rotation angle (in other words, rotation position) of the motor 11 of the first expansion valve 113.

The first current-voltage sensor 90 is attached to the first expansion valve 113. In the first current-voltage sensor 90, a current detector and a voltage detector are integrated, but the current detector and the voltage detector may be constructed separately.

A second current-voltage sensor 92 and a second rotation angle sensor 93 are connected to the input side of the second expansion valve controller 82. The second current-voltage sensor 92 is a second expansion valve current-voltage detector that detects an electric current and a voltage supplied to the motor 11 of the second expansion valve 115. The second rotation angle sensor 93 is a second rotation angle detector that detects a rotation angle (in other words, rotation position) of the motor 11 of the second expansion valve 115.

The second current-voltage sensor 92 is attached to the second expansion valve 115. In the second current-voltage sensor 92, a current detector and a voltage detector are integrated, but the current detector and the voltage detector may be constructed separately.

The following is an overview of operation of the vehicle air-conditioning device 100 in the present embodiment. The air conditioning controller 80 determines whether to execute the cooling mode, the heating mode, or the dehumidifying-heating mode based on detection signals from the group of control sensors, including the inside air temperature sensor 83, the outside air temperature sensor 84, the solar radiation sensor 85, the conditioned air temperature sensor 86, the high pressure refrigerant sensor 87, and the low pressure refrigerant sensor 88.

The air conditioning controller 80 controls opens and closes of the solenoid valve 117, the first expansion valve 113, and the second expansion valve 115 to switch to the determined operating mode.

In the cooling mode, the solenoid valve 117 is closed, the first expansion valve 113 is fully opened without throttling the refrigerant flow, and the second expansion valve 115 is opened to throttle the refrigerant flow. At this time, the air conditioning controller 80 determines a target throttle opening of the second expansion valve 115 based on the detection signals from the group of the control sensors and outputs the determined target throttle opening to the second expansion valve controller 82. The second expansion valve controller 82 controls the second expansion valve 115 so that an opening degree of the second expansion valve 115 becomes the target throttle opening output from the air conditioning controller 80.

In the heating mode, the solenoid valve 117 is opened, the first expansion valve 113 is opened to throttle the refrigerant flow, and the second expansion valve 115 is closed to shut off the refrigerant flow. At this time, the air conditioning controller 80 determines a target throttle opening of the first expansion valve 113 based on the detection signals from the group of the control sensors and outputs the determined target throttle opening to the first expansion valve controller 81. The first expansion valve controller 81 controls the first expansion valve 113 so that an opening degree of the first expansion valve 113 becomes the target throttle opening output from the air conditioning controller 80.

In the dehumidifying-heating mode, the solenoid valve 117 is closed, and the first expansion valve 113 and the second expansion valve 115 are set to valve openings that throttle the refrigerant flow. The air conditioning controller 80 determines the target throttle opening of the first expansion valve 113 and the target throttle opening of the second expansion valve 115 based on the detection signals from the group of control sensors, and outputs the determined target throttle opening to the first expansion valve controller 81 and the second expansion valve controller 82.

The first expansion valve controller 81 controls the first expansion valve 113 so that the opening degree of the first expansion valve 113 becomes the target throttle opening output from the air conditioning controller 80. The second expansion valve controller 82 controls the second expansion valve 115 so that the opening degree of the second expansion valve 115 becomes the target throttle opening output from the air conditioning controller 80.

The operation of the first expansion valve 113 in the present embodiment is described next. Since an operation of the second expansion valve 115 is similar to that of the first expansion valve 113, an explanation of the operation of the second expansion valve 115 is omitted.

The rotor 13 of the motor 11 rotates and the shaft 14 of the motor 11 also rotates together when the driving current is output from the first expansion valve controller 81 to the motor 11 of the first expansion valve 113. When the shaft 14 of the motor 11 rotates and the drive magnet 20 also rotates together, magnetic interaction between the drive magnet 20 and the fixed magnet 40 causes the pole piece 25 to rotate in the same direction as the rotation direction of the drive magnet 20.

A speed reduction ratio is equal to the number of poles of the pole piece 25, Pp, divided by the number of poles Pin of the drive magnet 20. Since the pole number Pp of the pole piece 25 is larger than the pole number Pin of the drive magnet 20, the rotation speed of the pole piece 25 is smaller than that of the drive magnet 20.

In the present embodiment, the number of poles Pp of the pole piece 25 is 42 and the number of poles Pin of the drive magnet 20 is 2, and therefore the speed reduction ratio is 21.

Contrary to this, in a configuration in which the pole piece 25 is fixed and a magnet having the number of poles same as that of the fixed magnet 40 is joined to the rotating member 41 of the driven-mechanism section 35 to rotate (hereinafter, the configuration is referred to as a comparative example), the speed reduction ratio is 20.

Since the number of poles Pp of the pole piece 25 is larger than the number of poles Pf of the fixed magnet 40, in the present embodiment in which the pole piece 25 is rotated, the speed reduction ratio is larger than that of the comparative example in which the magnet having the number of poles same as that of the fixed magnet 40 is rotated.

In the present embodiment, in which the pole piece 25 is rotated, the pole piece 25 is an independent member from the sealing plate 51. Therefore, the pressure resistance of the sealing plate 51 can be improved compared to a structure in which a pole piece does not rotate and is buried in a sealing plate.

The sealing plate 51 has the sealing cylindrical portion 51*b* and the sealing bottom portion 51*c*, which gives it a disk shape with its center portion concave toward the driven-mechanism section 35. Therefore, the sealing plate 51 can be arranged as an independent component from the pole piece 25, which increases the pressure resistance of the sealing plate 51.

The number Npp of the magnetic sections 25*a* having the pole piece 25 has a following relationship to the number of poles Pin of the drive magnet 20 and the number of poles Pf of the fixed magnet 40.

$$Npp = (Pin + Pf)/2$$

This allows the rotational force of the drive magnet 20 to be transmitted to the pole piece 25. The rotational force of the drive magnet 20 is transmitted to the pole piece 25, which rotates the rotating member 41, the output shaft of the power transmission device 1, and the rotational force of the rotating member 41 is transmitted to the valve body 48, which moves in the axial direction. The valve body 48 moves in the axial direction to open and close the valve port 52*a* of the valve chamber 52, thereby adjusting a flow rate of the refrigerant passing through the valve port 52*a*.

Figure 5:
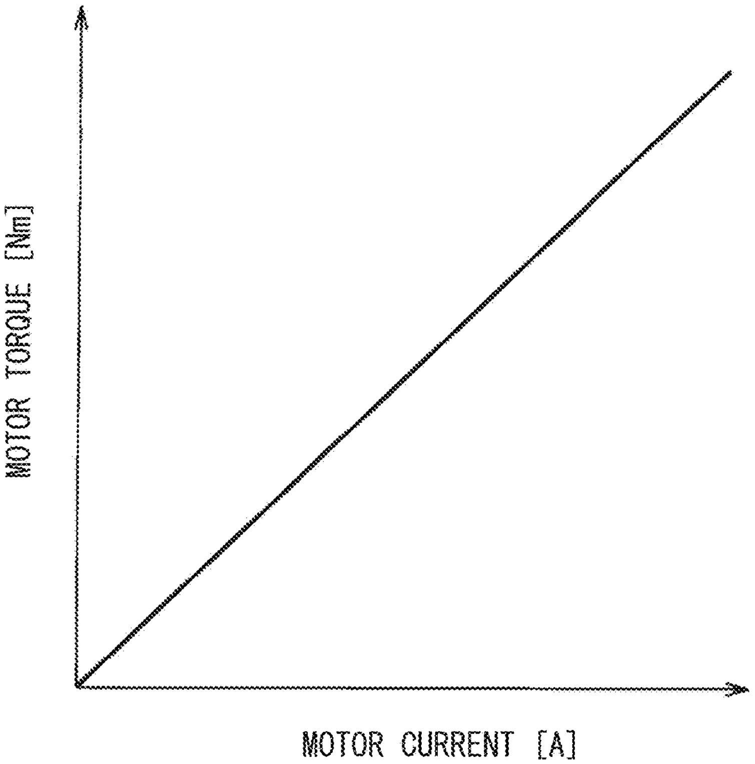
FIG. 5 is a graph illustrating a relationship between torque and electric current of a motor of the first expansion valve according to the first embodiment.

The first expansion valve controller 81 provides feedback control of the motor 11 based on the detection signals of the first current-voltage sensor 90 and the first rotation angle sensor 91. As shown in FIG. 5, the torque generated by the motor 11 (hereinafter referred to as motor torque) is proportional to the electric current supplied to the motor 11 (hereinafter referred to as motor current).

Figure 6:
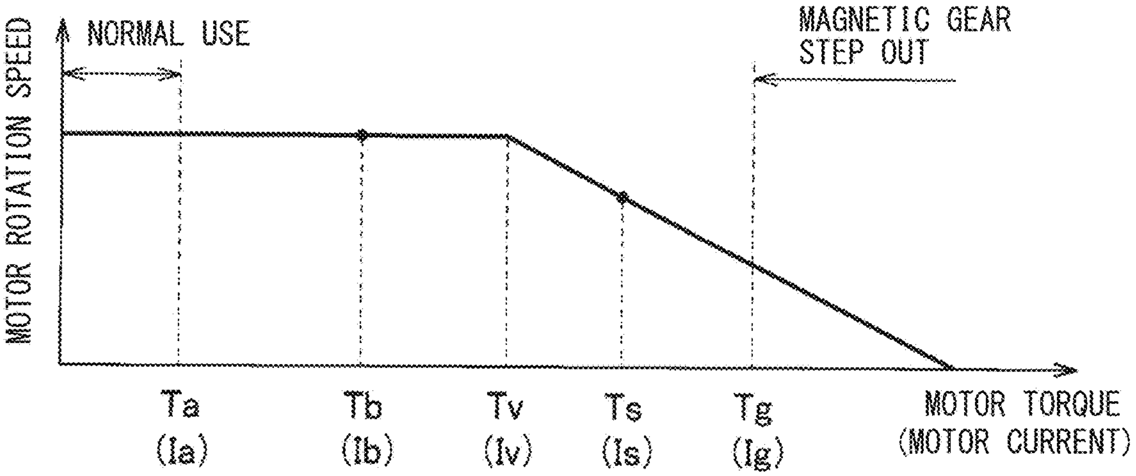
FIG. 6 is a graph illustrating fault detection current values and fully-closed current limit current values stored in a first expansion valve controller according to the first embodiment.

The first expansion valve controller 81 has a fault-detection current value Ib and a fully-closed current limit value Is shown in FIG. 6 stored in advance. The fault-detection current value Ib (in other words, an abnormal determination current value) is an electric current value corresponding to a fault-detection torque value Tb. The fully-closed current limit value Is is an electric current value corresponding to a fully-closed torque limit value Ts.

The fault-detection torque value Tb (in other words, an abnormality determination torque value) is a motor torque value when an abnormality occurs in actuation of the valve body 48. In other words, the fault-detection torque value Tb is the motor torque value when the motor torque increases rapidly due to an abnormality in the rotation of the motor 11 caused by interference of a foreign substance with the valve body 48 or other causes.

The fully-closed torque limit value Ts is a value of the motor torque when the valve body 48 fully closes the valve port 52*a*. In other words, the fully-closed torque limit value Ts is the motor torque value when the valve body 48 is pressed against the valve seat 55 and the motor torque surges.

As shown in FIG. 6, the fault-detection torque value Tb is larger than a maximum value Ta of the motor torque Ta when the valve body 48 is adjusting the opening of the valve port 52*a* normally (in other words, during normal use), and is less than a base speed torque value Tv of the motor 11.

The motor 11 has characteristic that the rotation speed of the motor 11 (hereinafter referred to as a motor rotation speed) is constant with respect to the motor torque in a range where the motor torque is smaller than the base speed torque value Tv and in a range where the motor torque is larger than the base speed torque value Tv, the motor rotation speed decreases as the motor torque increases.

Since the motor torque is proportional to the motor current as described above, the fault-detection current value Ib is larger than an adjusting current value Ia and smaller than the base speed current value Iv. The adjusting current value Ia is an electric current value corresponding to the maximum value Ta of the motor torque. The base speed current value Iv is an electric current value corresponding to the base speed torque value Tv.

The fully-closed torque limit value Ts is larger than the base speed torque value Tv and smaller than a step-out torque value Tg of the magnetic gear. The step-out torque value Tg is a minimum value of the motor torque at which the magnetic gear 60*b* steps out.

Therefore, the fully-closed current limit value Is is larger than the base speed current value Iv and smaller than the step-out current value Ig. The step-out current value Ig of the magnetic gear is an electric current value corresponding to the step-out torque value Tg.

Figure 7:
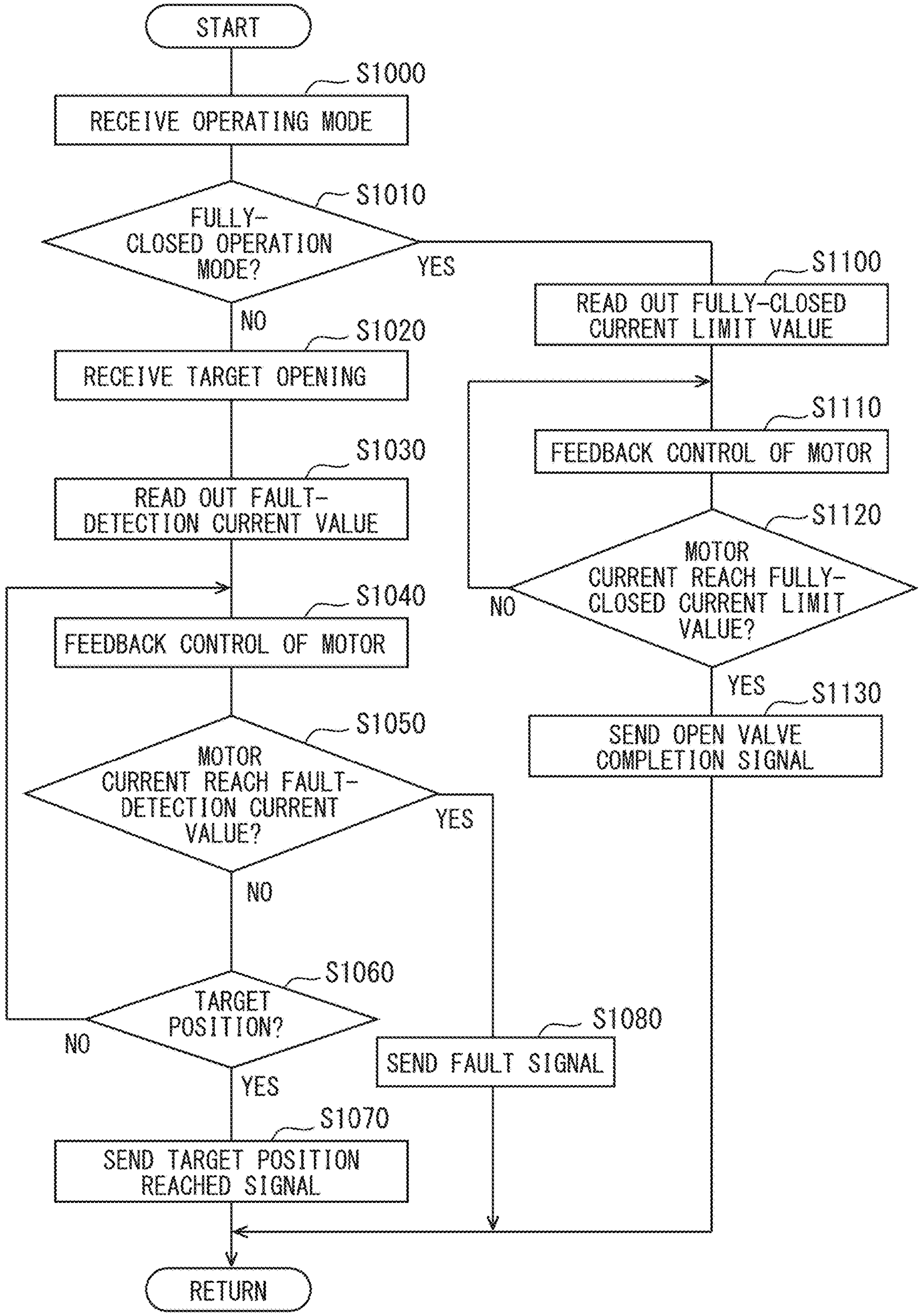
FIG. 7 is a flowchart illustrating a control process performed by the first expansion valve controller according to the first embodiment.

FIG. 7 is a flowchart illustrating a control process executed by the first expansion valve controller 81. In step S1000, an instruction signal for the operating mode of the first expansion valve 113 is input from the air conditioning controller 80. More specifically, the instruction signal is input for either a fully-closed operation mode or an opening degree adjustment mode. The fully-closed operation mode is an operating mode in which the first expansion valve 113 is fully closed. The opening degree adjustment mode is an operating mode in which the first expansion valve 113 is adjusted to the target opening.

In step S1010, it is determined whether the operation mode indicated by the air conditioning controller 80 is the fully-closed operation mode or not, and when it is determined that it is not the fully-closed operation mode (that is, the opening degree adjustment mode), it proceeds to step S1020.

In step S1020, an instruction signal for the target opening is input from the air conditioning controller 80. In step S1030, the fault-detection current value Ib stored in advance in the air conditioning controller 80 is read.

In step S1040, the motor 11 is feedback controlled to bring the rotation position of the motor 11 closer to the target position.

In step S1050, fault detection control (in other words, abnormality determination control) is performed. More specifically, based on a detection signal of the first current-voltage sensor 90, it is determined whether the motor current has reached the fault-detection current value Ib. In step S1050, when it is determined that the motor current has not reached the fault-detection current value Ib, proceed to step S1060.

In step S1060, it is determined whether the rotation position of the motor 11 has reached the target position based on the detection signal of the first rotation angle sensor 91. When it is determined that the rotation position of the motor 11 has not reached the target position, return to step S1040.

In step S1060, when it is determined that the rotation position of the motor 11 has reached the target position, go to step S1070 and a signal indicating that the motor 11 has reached the target position is output to the air conditioning controller 80.

In step S1050, when it is determined that the motor current has reached the fault-detection current value Ib, go to step S1080 and a fault signal of expansion valve is sent to the air conditioning controller 80.

Since the motor current is considered to have become larger than the adjusting current value Ia due to interference from foreign substance, it is presumed that the first expansion valve 113 has failed (in other words, an abnormality has occurred in the operation of the valve body 48).

In step S1010, when it is determined that the operation mode indicated by the air conditioning controller 80 is the fully-closed operation mode, it proceeds to step S1100 to acquire the fully-closed current limit value Is stored previously in the air conditioning controller 80.

In step S1110, the motor 11 is feedback controlled to bring the rotation position of the motor 11 closer to the target position (a position at which the valve body 48 is fully closed). In step S1120, based on the detection signal of the first current-voltage sensor 90, it is determined whether the motor current has reached the fully-closed current limit value Is. In step S1120, when it is determined that the motor current has not reached the fully-closed current limit value Is, return to step S1110.

In step S1120, when it is determined that the motor current has reached the fully-closed current limit value Is, it proceeds to step S1130, where a signal indicating that the valve closure is complete is output to the air conditioning controller 80.

As a result, the torque of the motor 11 is prevented from exceeding the step-out torque value Tg, thereby preventing the magnetic gear 60*b* from stepping out and repeating forward and reverse rotation. As a result, the first expansion valve 113 can be fully closed reliably.

Since the fully-closed torque limit value Ts is larger than the base speed torque value Tv, the first expansion valve 113 can be fully closed reliably with a larger motor torque than when the fully-closed torque limit value Ts is smaller than the base speed torque value Tv.

The above control process is capable of detecting a failure of the first expansion valve 113 when the valve body 48 is used to adjust the degree of opening of the valve port 52*a*, and ensuring that the valve port 52*a* is fully closed when the valve body 48 is used to fully close the valve port 52*a*.

A configuration in which the base speed torque value Tv is smaller than the step-out torque value Tg, as in this configuration, can reduce a motor size, but there is a concern that if the magnetic gear is step-out during the fully-closed operation, the valve will not be able to close.

Regarding this, in the present embodiment, the motor 11 is operated with current limitation during the full-close operation, which prevents reversal due to stalling of the magnetic gear 60*b* and ensures the full-close operation.

In addition, due to the characteristics of the magnetic gear 60*b*, the load torque gradually increases and decelerates from seating to fully closing, which improves sealing performance.

By not applying the fault detection during the fully-closed operation, refrigerant leakage can be reduced by tightening the valve body 48 with the appropriate motor torque after the valve body 48 is seated on the valve seat 55. Since the fully-closed current limit value Is is reached at the completion of the fully-closed operation, the completion of the fully-closed operation can be detected.

By applying the fault detection during flow adjustment operation, a fault that causes the output shaft of the motor 11 or the valve body 48 to stop moving due to foreign substance clogging or other causes can be detected by reaching the fault-detection current value Ib. Therefore, the magnetic gear 60*b* can be prevented from stalling due to malfunction, which prevents large fluctuations in motor rotation speed due to stalling of the magnetic gear 60*b*, which in turn prevents large vibrations in a refrigerant piping.

In the present embodiment, the first expansion valve controller 81 limits the electric current supplied to the motor 11 during the full-close operation to less than the fully-closed current limit value Is. The fully-closed current limit value Is is an electric current value greater than the adjusting current value Ia.

According to this, the stalling of the magnetic gear 60*b* due to excessive motor current during the fully-closed operation can be reduced. Therefore, reversal of the valve body 48 due to the de-tuning of the magnetic gear 60*b* can be reduced, which improves the full-closing performance of the valve port 52*a*.

In the present embodiment, the fully-closed current limit value Is is an electric current value smaller than the step-out current value Ig. As a result, the step-out of the magnetic gear 60*b* during the fully closed operation can be reduced.

In the present embodiment, the first expansion valve controller 81 performs the fault detection control. The fault detection control determines that the first expansion valve 113 has failed when the electric current supplied to the motor 11 reaches the fault-detection current value Ib. The fault-detection current value Ib is an electric current value that is larger than the adjusting current value and smaller than the fully-closed current limit value. According to this, the failure of the first expansion valve 113 can be detected before the magnetic gear 60*b* is de-energized.

In the present embodiment, the fault-detection current value Ib is an electric current value smaller than the step-out current value Ig. According to this, the failure of the first expansion valve 113 can be reliably detected before the magnetic gear 60*b* is pulled out of synchronism.

In the present embodiment, the adjusting current value Ia, the fault-detection current value Ib, the fully-closed current limit value Is, and the step-out current value Ig are in a relationship Ia<Ib<Is<Ig. According to this, it is possible to reliably determine that an abnormality has occurred in the actuation of the valve body 48 before the magnetic gear 60*b* causes a loss of synchronization, and it is also possible to reliably reduce the step-out of the magnetic gear 60*b* during the fully-closed operation.

In the present embodiment, the first expansion valve controller 81 does not perform the fault detection control during the fully-closed operation. This avoids false detection of a failure of the first expansion valve 113 when the valve body 48 closes the valve port 52*a*.

In the present embodiment, the fully-closed current limit value Is is the motor current value when the motor 11 is unable to rotate. As a result, the step-out of the magnetic gear 60*b* during the fully closed operation can be reduced.

Second Embodiment

In the first embodiment above, the adjusting current value Ia, the fault-detection current value Ib, the base speed current value Iv, the fully-closed current limit value Is, and the step-out current value Ig have the relationship Ia<Ib<Iv<Is<Ig.

Figure 8:
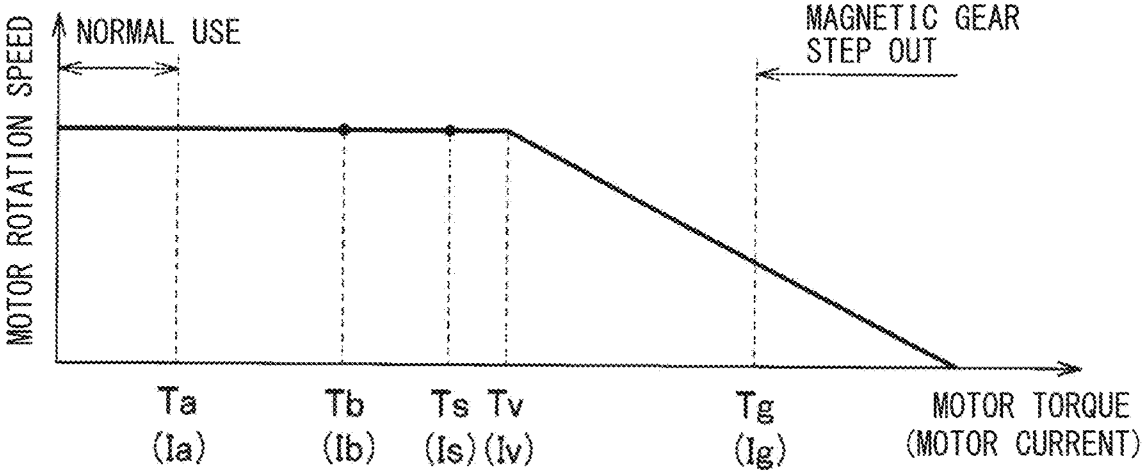
FIG. 8 is a graph illustrating fault detection current values and fully-closed current limit current values stored in a first expansion valve controller according to a second embodiment.

In the present embodiment, as shown in FIG. 8, an adjusting current value Ia, a fault-detection current value Ib, a base speed current value Iv, a fully-closed current limit value Is, and a step-out current value Ig have a relationship Ia<Ib<Is<Iv<Ig.

As a result, the valve is able to rotate at the base speed even when the valve is closed, thus reducing a time to close compared to the first embodiment above, where the valve rotates at a slower speed than the base speed when the valve is closed.

Third Embodiment

In the first embodiment above, the adjusting current value Ia, the fault-detection current value Ib, the base speed current value Iv, the fully-closed current limit value Is, and the step-out current value Ig have the relationship Ia<Ib<Iv<Is<Ig.

Figure 9:
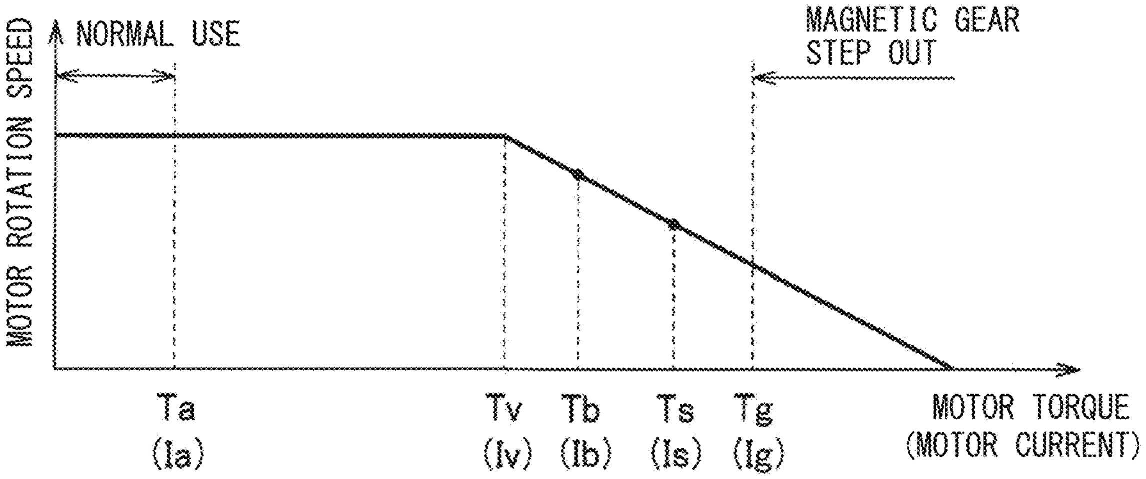
FIG. 9 is a graph illustrating fault detection current values and fully-closed current limit current values stored in a first expansion valve controller according to a third embodiment.

In the present embodiment, as shown in FIG. 9, an adjusting current value Ia, a fault-detection current value Ib, a base speed current value Iv, a fully-closed current limit value Is, and a step-out current value Ig have a relationship Ia<Iv<Ib<Is<Ig.

As a result, since the fault-detection torque value Tb is larger than in the first embodiment, the flow adjustment operation can be performed with a larger torque than in the first embodiment.

Fourth Embodiment

In the first embodiment above, the adjusting current value Ia, the fault-detection current value Ib, the base speed current value Iv, the fully-closed current limit value Is, and the step-out current value Ig have the relationship Ia<Ib<Iv<Is<Ig.

Figure 10:
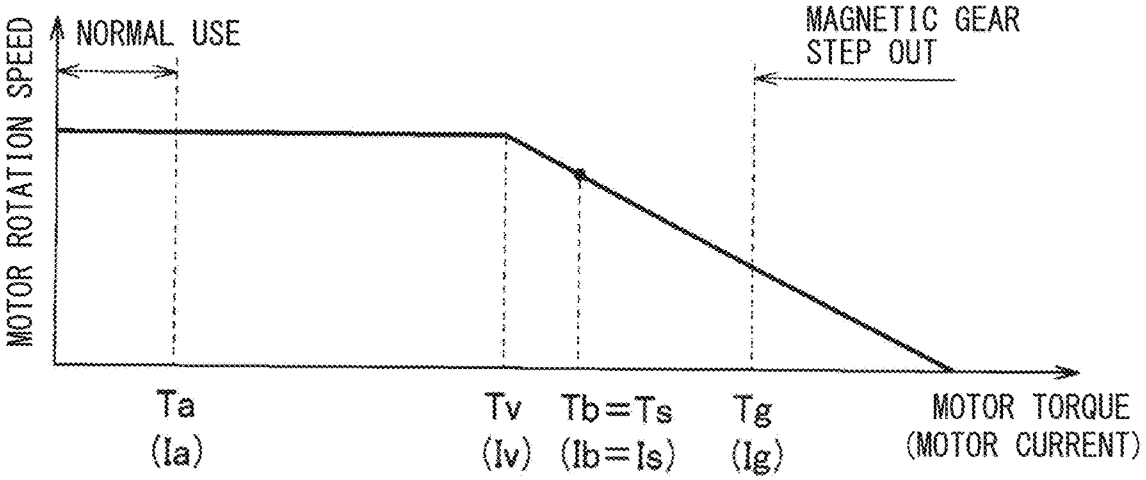
FIG. 10 is a graph illustrating fault detection current values and fully-closed current limit current values stored in a first expansion valve controller according to a fourth embodiment.

In the present embodiment, as shown in FIG. 10, an adjusting current value Ia, a fault-detection current value Ib, a base speed current value Iv, a fully-closed current limit value Is, and a step-out current value Ig have a relationship Ia<Iv<Ib=Is<Ig.

As a result, control is simplified compared to a case where the fault-detection torque value Tb and the fully-closed torque limit value Ts are different from each other.

Fifth Embodiment

In the fault detection control of the first embodiment above, when the electric current of the motor 11 reaches the fault-detection current value Ib, the first expansion valve 113 is judged to have failed, but in a fifth embodiment, when an electric current of a motor 11 reaches a fault-detection current value Ib and the motor 11 is not rotating, a first expansion valve 113 is judged to have failed.

Figure 11:
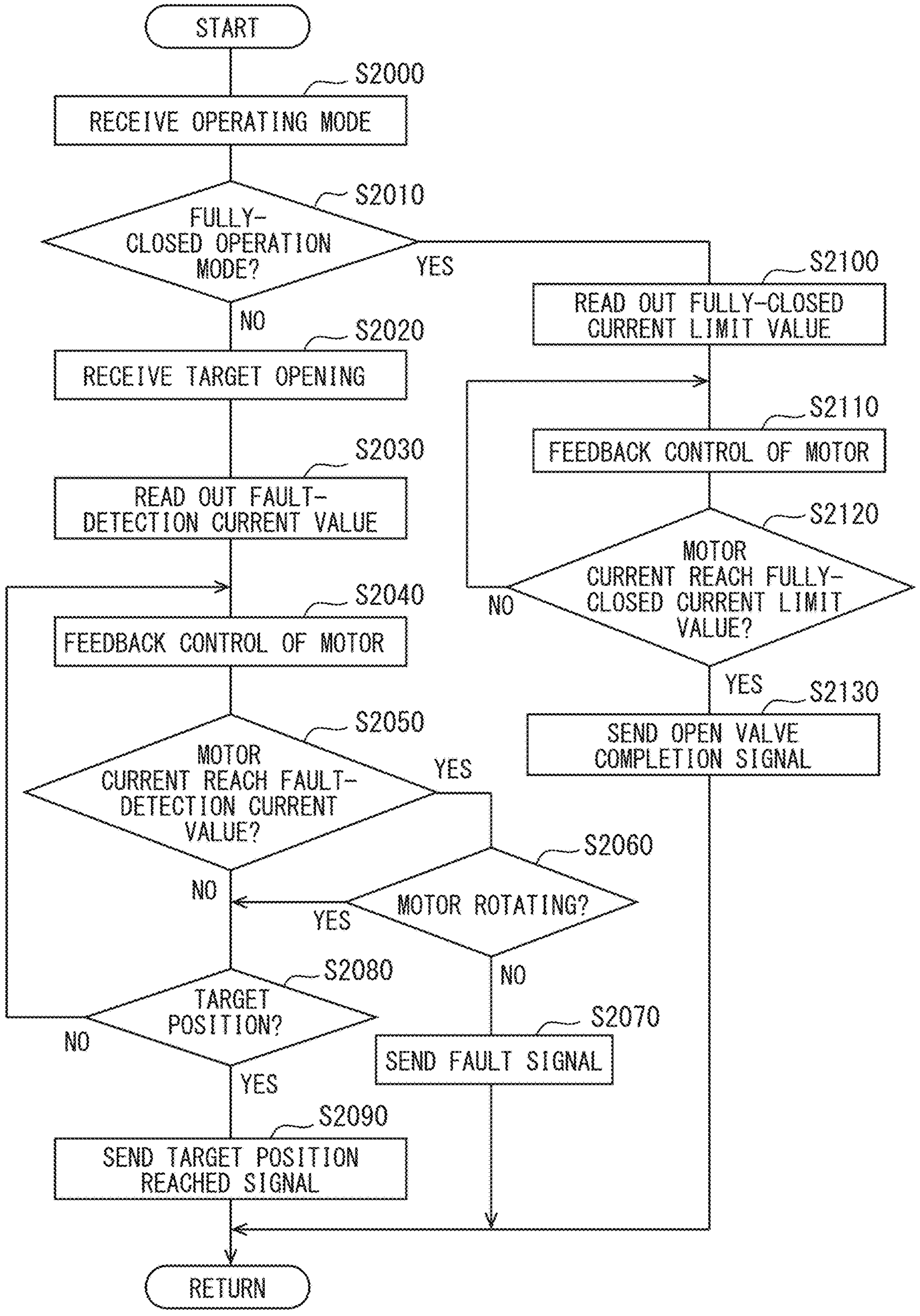
FIG. 11 is a flowchart illustrating a control process performed by a first expansion valve controller according to a fifth embodiment.

FIG. 11 is a flowchart illustrating a control process performed by a first expansion valve controller 81 according to the fifth embodiment. In step S2000, an indication signal for an operating mode is input from an air conditioning controller 80. In step S2010, it is determined whether the operation mode indicated by the air conditioning controller 80 is a fully-closed operation mode or not, and when it is determined that it is not the fully-closed operation mode (that is, an opening degree adjustment mode), it proceeds to step S2020.

In step S2020, an instruction signal for the target opening is input from the air conditioning controller 80. In step S2030, the fault-detection current value Ib stored in advance in the air conditioning controller 80 is read. In step S2040, the motor 11 is feedback controlled to bring the rotation position of the motor 11 closer to the target position.

In step S2050, based on a detection signal of a first current-voltage sensor 90, it is determined whether the motor current has reached the fault-detection current value Ib. In step S2050, when it is determined that the motor current has reached the fault-detection current value Ib, proceed to step S2060.

In step S2060, it is determined whether the motor 11 is rotating based on the detection signal of a first rotation angle sensor 91. In step S2060, when it is determined that the motor 11 is not rotating, go to step S2070, where a malfunction signal of the expansion valve is sent to the air conditioning controller 80.

The first expansion valve 113 is presumed to have failed, not only because the motor current has become larger than the adjusting current value Ia due to foreign matter interference, but also because the motor 11 is presumed to be unable to rotate.

In step S2050, when it is determined that the motor current has not reached the fault-detection current value Ib, proceed to step S2080. In step S2060, when it is determined that the motor 11 is rotating, it also proceeds to step S2080.

In step S2080, it is determined whether a rotation position of the motor 11 has reached the target position based on the detection signal of the first rotation angle sensor 91. When it is determined that the rotation position of the motor 11 has not reached the target position, return to step S2040.

In step S2080, when it is determined that the rotation position of the motor 11 has reached the target position, go to step S2090 and a signal indicating that the motor 11 has reached the target position is output to the air conditioning controller 80.

In step S2010, when it is determined that the operation mode indicated by the air conditioning controller 80 is the fully-closed operation mode, it proceeds to step S2100 to acquire the fully-closed current limit value Is stored previously in the air conditioning controller 80.

In step S2110, the motor 11 is feedback controlled to bring the rotation position of the motor 11 closer to the target position (a position at which the valve body 48 is fully closed). In step S2120, based on the detection signal of the first current-voltage sensor 90, it is determined whether the motor current has reached the fully-closed current limit value Is. In step S2120, when it is determined that the motor current has not reached the fully-closed current limit value Is, return to step S2110.

In step S2120, when it is determined that the motor current has reached the fully-closed current limit value Is, it proceeds to step S2130, where a signal indicating that the valve closure is complete is output to the air conditioning controller 80.

As in the first embodiment, the above control process is capable of detecting a failure of the first expansion valve 113 when the valve body 48 is used to adjust the degree of opening of the valve port 52*a*, and ensuring that the valve port 52*a* is fully closed when the valve body 48 is used to fully close the valve port 52*a*.

In the present embodiment, the first expansion valve controller 81 determines that the first expansion valve 113 has failed when the motor current reaches the fault-detection current value Ib in the fault detection control and when the motor 11 becomes unable to rotate.

According to this, the failure of the first expansion valve 113 can be reliably detected before the magnetic gear 60*b* is de-energized.

Sixth Embodiment

In the fault detection control of the first embodiment above, when the electric current of the motor 11 reaches the fault-detection current value Ib, the first expansion valve 113 is judged to have failed, but in a sixth embodiment, a first expansion valve 113 is determined to have failed when a motor 11 fails to reach a target position within a predetermined time.

Figure 12:
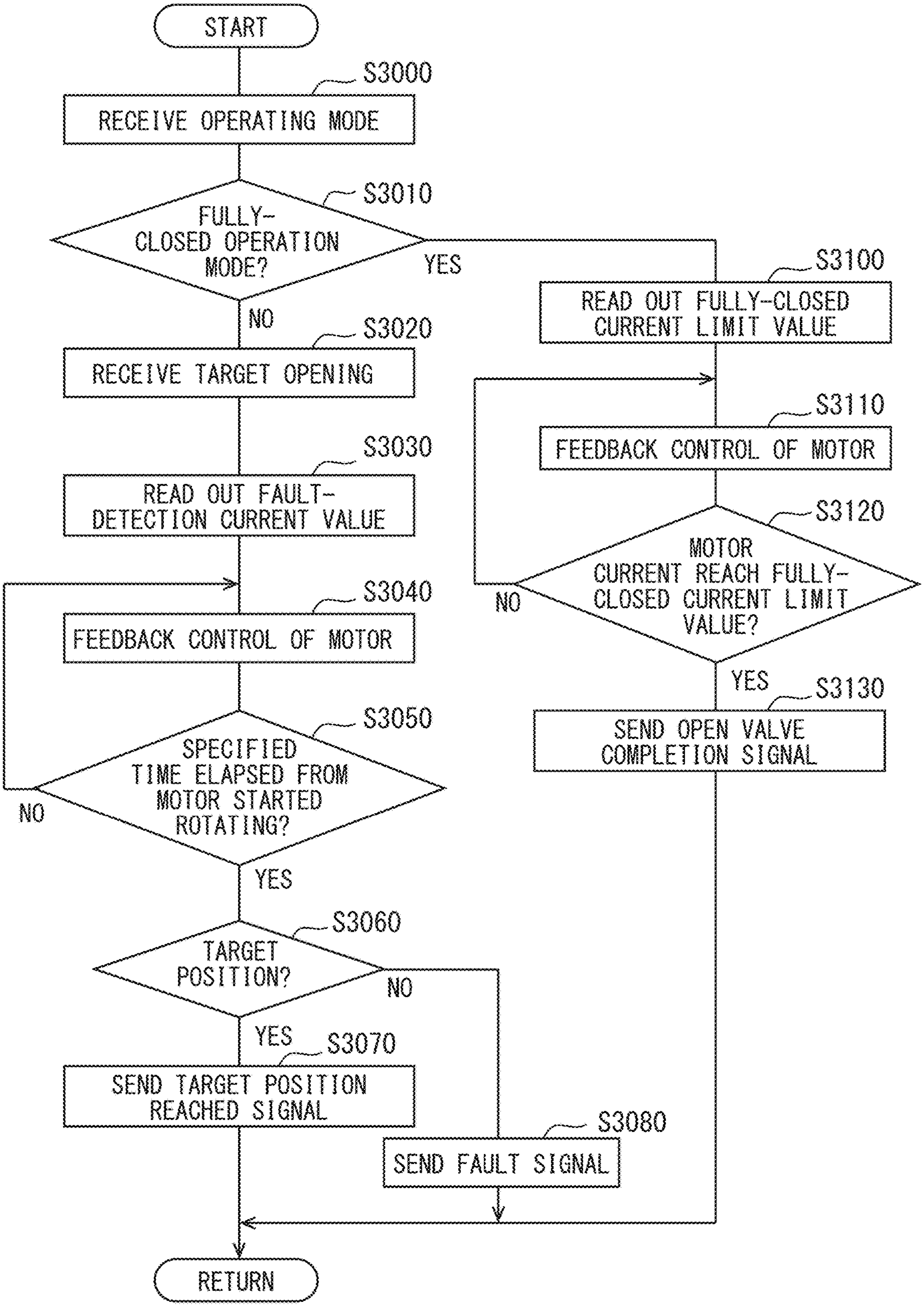
FIG. 12 is a flowchart illustrating a control process performed by a first expansion valve controller according to a sixth embodiment.

FIG. 12 is a flowchart illustrating a control process performed by a first expansion valve controller 81 according to the sixth embodiment. In step S3000, an indication signal for an operating mode is input from an air conditioning controller 80. In step S3010, it is determined whether the operation mode indicated by the air conditioning controller 80 is a fully-closed operation mode or not, and when it is determined that it is not the fully-closed operation mode (that is, an opening degree adjustment mode), it proceeds to step S3020.

In step S3020, an instruction signal for the target opening is input from the air conditioning controller 80. In step S3030, the fault-detection current value Ib stored in advance in the air conditioning controller 80 is read.

In step S3040, the motor 11 is feedback controlled to bring the rotation position of the motor 11 closer to the target position. In step S3050, it is determined whether a predetermined time has elapsed since the motor 11 started rotating. When it is determined that the predetermined time has not elapsed since the motor 11 started rotating, return to step S3040.

When it is determined at step S3050 that the predetermined time has elapsed since the motor 11 started rotating, it proceeds to step S3060 to determine whether the rotation position of the motor 11 has reached the target position within the predetermined time based on the detection signal of a first rotation angle sensor 91.

In step S3060, when it is determined that the rotation position of the motor 11 has reached the target position, go to step S3070 and a signal indicating that the motor 11 has reached the target position is output to the air conditioning controller 80.

In step S3060, when it is determined that the rotation position of the motor 11 has not reached the target position within the predetermined time, go to step S3080, where a malfunction signal of the expansion valve is sent to the air conditioning controller 80.

The first expansion valve 113 is presumed to have failed because the rotation position of the motor 11 is presumed to be prevented from reaching the target position by interference from foreign substance.

In step S3010, when it is determined that the operation mode indicated by the air conditioning controller 80 is the fully-closed operation mode, it proceeds to step S3100 to acquire the fully-closed current limit value Is stored previously in the air conditioning controller 80. In step S3110, the motor 11 is feedback controlled to bring the rotation position of the motor 11 closer to the target position (a position at which the valve body 48 is fully closed). In step S3120, based on the detection signal of the first current-voltage sensor 90, it is determined whether the motor current has reached the fully-closed current limit value Is. In step S3120, when it is determined that the motor current has not reached the fully-closed current limit value Is, return to step S3110.

In step S3120, when it is determined that the motor current has reached the fully-closed current limit value Is, it proceeds to step S3130, where a signal indicating that the valve closure is complete is output to the air conditioning controller 80.

As in the first embodiment, the above control process is capable of detecting a failure of the first expansion valve 113 when the valve body 48 is used to adjust the degree of opening of the valve port 52*a*, and ensuring that the valve port 52*a* is fully closed when the valve body 48 is used to fully close the valve port 52*a*.

In the present embodiment, the first expansion valve controller 81 determines that the first expansion valve 113 has failed when the motor current reaches the fault-detection current value Ib in the fault detection control and when the motor 11 has not reached the target rotation position within the predetermined time. The fault-detection current value Ib is an electric current value that is larger than the adjusting current value and smaller than the fully-closed current limit value.

According to this, the failure of the first expansion valve 113 can be reliably detected before the magnetic gear 60*b* is de-energized.

The present disclosure is not limited to the above-described embodiments, and can be variously modified as follows within the scope that does not deviate from the gist of the present disclosure.

The above embodiment shows an example in which the present disclosure is applied to an expansion valve of a vapor compression refrigeration cycle, but it is not limited to expansion valves and can be applied to various electric valves which open and close a valve orifice through which fluid passes using a valve body of a motor-operated valve.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A motor-operated valve comprising:

a motor generating rotational driving force by supply of electric power;

a valve seat having a valve port through which fluid passes;

a valve body for opening and closing the valve port;

a magnetic gear for magnetically transmitting the rotational driving force from an output shaft of the motor to the valve body; and a controller configured to control electric current supplied to the motor, wherein the controller is configured to limit the electric current supplied to the motor to be equal to or less than a fully-closed current limit value during a fully-closed operation in which the valve port is to be fully closed by the valve body, the fully-closed current limit value is greater than an adjusting current value by which an electric current is supplied to the motor during opening adjustment when an opening degree of the valve port is adjusted by the valve body, and the fully-closed current limit value is less than a step-out current value which is an electric current valve when the magnetic gear causes a loss of synchronization.

2. The motor-operated valve according to claim 1, wherein the controller is configured to perform abnormality determination control to determine that an abnormality has occurred in operation of the valve body in response to the electric current supplied to the motor reaching a determination current value, and the determination current value is greater than the adjusting current value and less than the fully-closed current limit value.

3. The motor-operated valve according to claim 1, wherein the controller is configured to perform abnormality determination control to determine that an abnormality has occurred in operation of the valve body in response to the electric current supplied to the motor reaching a determination current value and the motor being unable to rotate, and the determination current value is greater than the adjusting current value and less than the fully-closed current limit value.

4. The motor-operated valve according to claim 1, wherein the controller is configured to perform abnormality determination control to determine that an abnormality has occurred in operation of the valve body in response to the electric current supplied to the motor reaching a determination current value and the motor not reaching a target rotation position within a predetermined time, and the determination current value is greater than the adjusting current value and less than the fully-closed current limit value.

5. The motor-operated valve according to claim 1, wherein the determination current value is less than a step-out current value which is an electric current valve when the magnetic gear causes a loss of synchronization.

6. The motor-operated valve according to claim 5, wherein the adjusting current value is "Ia", the determination current value is "Ib", the fully-closed current limit value is "Is", the step-out current value is "Ig", and a relationship of $Ia<Ib<Is<Ig$ holds.

7. The motor-operated valve according to claim 6, wherein the controller is configured not to perform the abnormality determination control during the fully-closed operation.

8. The motor-operated valve according to claim 1, wherein the controller is configured to perform feedback control on the electric current supplied to the motor based on a rotation position of the motor, and the fully-closed current limit value is an electric current value by which an electric current is supplied to the motor when the motor becomes unable to rotate.

9. A motor-operated valve comprising:

a motor generating rotational driving force by supply of electric power;

a valve seat having a valve port through which fluid passes;

a valve body for opening and closing the valve port;

a magnetic gear for magnetically transmitting the rotational driving force from an output shaft of the motor to the valve body; and a controller configured to control electric current supplied to the motor, wherein the controller is configured to limit the electric current supplied to the motor to be equal to or less than a fully-closed current limit value during a fully-closed operation in which the valve port is to be fully closed by the valve body, the fully-closed current limit value is greater than an adjusting current value by which an electric current is supplied to the motor during opening adjustment when an opening degree of the valve port is adjusted by the valve body, the controller is configured to perform abnormality determination control to determine that an abnormality has occurred in operation of the valve body in response to the electric current supplied to the motor reaching a determination current value and the motor being unable to rotate, and the determination current value is greater than the adjusting current value and less than the fully-closed current limit value.

10. A motor-operated valve comprising:

a motor generating rotational driving force by supply of electric power;

a valve seat having a valve port through which fluid passes;

a valve body for opening and closing the valve port;

a magnetic gear for magnetically transmitting the rotational driving force from an output shaft of the motor to the valve body; and a controller configured to control electric current supplied to the motor, wherein the controller is configured to limit the electric current supplied to the motor to be equal to or less than a fully-closed current limit value during a fully-closed operation in which the valve port is to be fully closed by the valve body, the fully-closed current limit value is greater than an adjusting current value by which an electric current is supplied to the motor during opening adjustment when an opening degree of the valve port is adjusted by the valve body, the controller is configured to perform abnormality determination control to determine that an abnormality has occurred in operation of the valve body in response to the electric current supplied to the motor reaching a determination current value and the motor not reaching a target rotation position within a predetermined time, and the determination current value is greater than the adjusting current value and less than the fully-closed current limit value.

11. A motor-operated valve comprising:

a motor generating rotational driving force by supply of electric power;

a valve seat having a valve port through which fluid passes;

a valve body for opening and closing the valve port;

a magnetic gear for magnetically transmitting the rotational driving force from an output shaft of the motor to the valve body; and a controller configured to control electric current supplied to the motor, wherein the controller is configured to limit the electric current supplied to the motor to be equal to or less than a fully-closed current limit value during a fully-closed operation in which the valve port is to be fully closed by the valve body, the fully-closed current limit value is greater than an adjusting current value by which an electric current is supplied to the motor during opening adjustment when an opening degree of the valve port is adjusted by the valve body, and the determination current value is less than a step-out current value which is an electric current valve when the magnetic gear causes a loss of synchronization.

12. The motor-operated valve according to claim 11, wherein the adjusting current value is "Ia", the determination current value is "Ib", the fully-closed current limit value is "Is", the step-out current value is "Ig", and a relationship of Ia<Ib<Is<Ig holds.

13. The motor-operated valve according to claim 12, wherein the controller is configured not to perform the abnormality determination control during the fully-closed operation.

14. A motor-operated valve comprising:

a motor generating rotational driving force by supply of electric power;

a valve seat having a valve port through which fluid passes;

a valve body for opening and closing the valve port;

a magnetic gear for magnetically transmitting the rotational driving force from an output shaft of the motor to the valve body; and a controller configured to control electric current supplied to the motor, wherein the controller is configured to limit the electric current supplied to the motor to be equal to or less than a fully-closed current limit value during a fully-closed operation in which the valve port is to be fully closed by the valve body, the fully-closed current limit value is greater than an adjusting current value by which an electric current is supplied to the motor during opening adjustment when an opening degree of the valve port is adjusted by the valve body, the controller is configured to perform feedback control on the electric current supplied to the motor based on a rotation position of the motor, and the fully-closed current limit value is an electric current value by which an electric current is supplied to the motor when the motor becomes unable to rotate.

* * * * *